United States Patent [19]
Redlich

[11] Patent Number: 4,605,930
[45] Date of Patent: Aug. 12, 1986

[54] INTEGRAL MONITOR FOR ILS LOCALIZER

[76] Inventor: Robert W. Redlich, 9 Grand Park Blvd., Athens, Ohio 45701

[21] Appl. No.: 468,170

[22] Filed: Apr. 20, 1983

[51] Int. Cl.$^4$ ............................................. G01S 1/16
[52] U.S. Cl. ................................................... 343/413
[58] Field of Search ................ 343/410, 413, 411, 412

[56] References Cited
U.S. PATENT DOCUMENTS
4,107,688  8/1978  Alford .................................. 343/413

Primary Examiner—Salvatore Cangialosi
Assistant Examiner—Gregory C. Issing

[57] ABSTRACT

An improved integral monitor for the Instrument Landing System Localizer is disclosed, which uses resistive networks and transmission lines to generate analogs of radiated signal at three specified angles from runway centerline.

1 Claim, 3 Drawing Figures

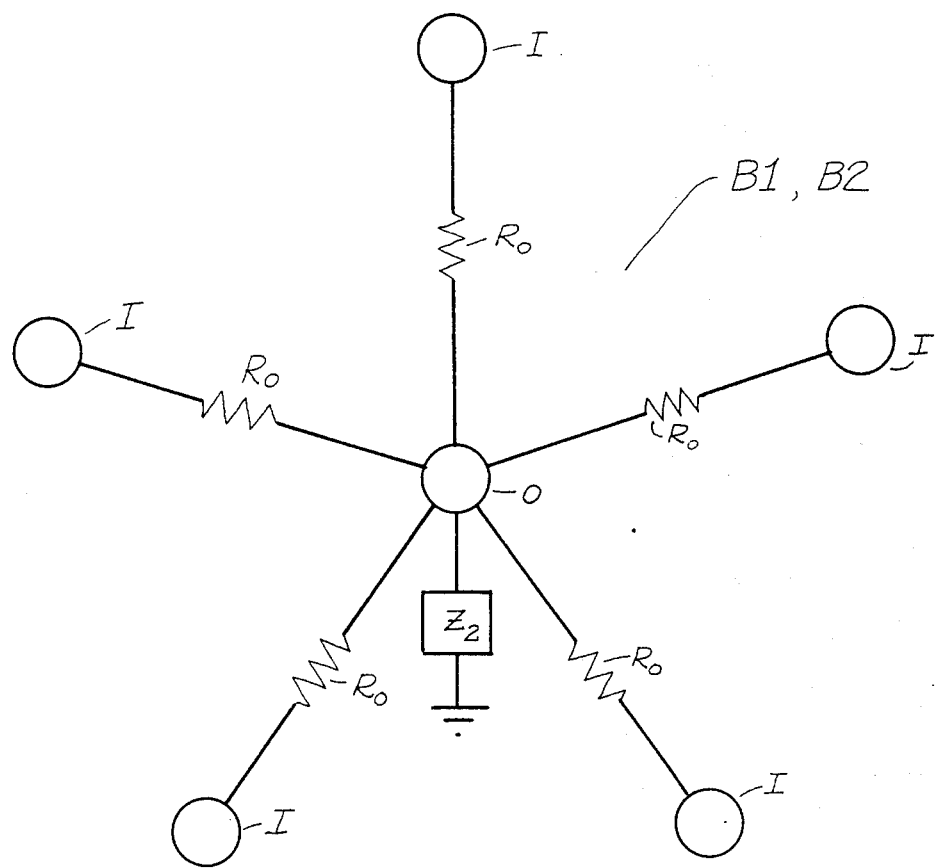

INTEGRAL MONITOR FOR ILS LOCALIZER

BACKGROUND OF THE INVENTION

References:
1. Redlich, R., and Davidson, T., "An Integral Monitor for the ILS Localizer". IEEE Transactions on Aerospace and Electronic Systems. Sept., 1966, pg. 618.
2. Petersen, C., "Localizer Traveling Wave Antenna Development". Department of Transportation, Federal Aviation Administration. Report No. FAA-RD-76-129. May, 1976, pgs. 10,22,23.

Instrument Landing System (ILS) Localizer signals must be continuously monitored to ensure that aircraft executing an ILS approach receive safe and accurate guidance. Monitoring requires ground based prediction of the signals radiated by the localizer array. Antennas in the near field of the Localizer transmitting array have been used to obtain monitoring signals, but these produce inaccurate predictions of far-field performance.

So called "Integral monitors" are in wide use and generate analogs of the far-field radiated signal at one or more angles from runway centerline. Such monitors according to current practice generate analogs of far-field signal on runway centerline ("course" signal) and of far-field signal at an angle of about two degrees from runway centerline ("width" signal). Monitoring of a third angle in the so called "clearance" region from twenty to thirty five degrees from runway centerline is frequently necessary. Integral monitors in current use which monitor a clearance angle do not generate a true far field analog because of the nearly twofold increase in components which would be necessary to analog monitor a third angle, and because of difficulties in monitoring a relatively large angle using current analog technique. Consequently the clearance signal produced by currently used monitors may not correlate with far-field measurements.

The present invention remedies the deficiencies of presently used integral monitors by generating accurate analogs of far field signals on course, at the width angle, and at an angle in the clearance region. Further, the invention uses inexpensive, compact, and reliable components.

SUMMARY OF THE INVENTION

The invention is an improvement in the well known technique of analog monitoring (see Background References, pg. 1), according to which an analog of the signal radiated by a linear array of N antennas located at distances $S(n), (n=1,2,3,---,N)$, from a point on the line of the array is constructed by adding sample signals $V(n)$ from each antenna according to the formula:

$$\text{analog of far field signal at angle } \theta = \sum_{m=1}^{N} V(n) \times e^{-j\frac{2\pi}{\lambda} S(n)\sin\theta} \quad (1)$$

If the sample signal $V(n)$ is proportional to the radiofrequency current in antenna n, then the right hand side of equation (1) is proportional to the array factor at angle $\theta$ from a line perpendicular to the array, hence the output is an analog of the radiated signal at angle $\theta$. The exponential factor in (1) represents a phase lag through an angle $(2\pi/\lambda) \times S(n) \times \sin\theta$, where $\lambda$ is operating wavelength.

Monitoring three different angles requires;
(a) divide each $V(n)$ into three channels
(b) introduce phase lags in each channel according to equation (1)
(c) sum the phase shifted signals in each channel.

(a) must be performed without introducing excessive crosstalk between channels. It is conventionally performed by hybrid couplers which have low crosstalk and low loss, but are expensive, bulky, and are required in large numbers if three angles are to be monitored. Part of the invention is a means of dividing $V(n)$ into three channels with acceptably low crosstalk, by the use of simple resistive dividers mounted on a single compact circuit board.

(b) is accomplished conventionally, and in the invention, by lengths of transmission line terminated in a matched load. However, in the clearance channel, such lines can reach lengths of 20 meters or more, and hence introduce significant attenuation which will degrade monitoring accuracy unless it is compensated for. In a conventional monitor using hybrid couplers for signal division, such compensation cannot be conveniently introduced. Another part of the invention is a simple means of compensating for attenuation in the phase shift lines of the clearance channel.

BRIEF DESCRIPTION OF THE DRAWINGS

For clarity, all of the drawings illustrate a case where the Localizer array being monitored has only five antennas. However, the principles illustrated and further explained later apply to Localizer arrays with any number of antennas.

FIG. 3 is a schematic circuit diagram of subassemblies B1 and B2 of FIG. 1.

DESCRIPTION OF A TYPICAL EMBODIMENT

To simplify description, each of the assumed five antennas of the Localizer array will be identified by an index number n, where n equals 1, 2, 3, 4, or 5 and each antenna has a different index number. Also, the distance from antenna n to a reference point on the line of the array but outside its aperture will be designated $S(n)$. It is assumed that each antenna, in accordance with common practice, is fitted with means for obtaining a radiofrequency sample signal proportional to the radiofrequency current in that antenna, and that transmission lines of equal length are provided to convey the sample signals to a monitor unit. The sample signals will be referred to as $V(n)$.

According to the invention, three output signals are produced which are proportional to the far field radiation from the Localizer array at three specified angles from runway center line. One of these angles is zero degrees ("course") and the corresponding output will be referred to as course output. The second angle of typically two degrees ("width" angle $\theta_w$), and the corresponding output will be referred to as width output. The third angle is typically in the range twenty to thirty degrees ($\theta_{cl}$, the "clearance" angle) and the corresponding output will be referred to as clearance output.

Figure 1:
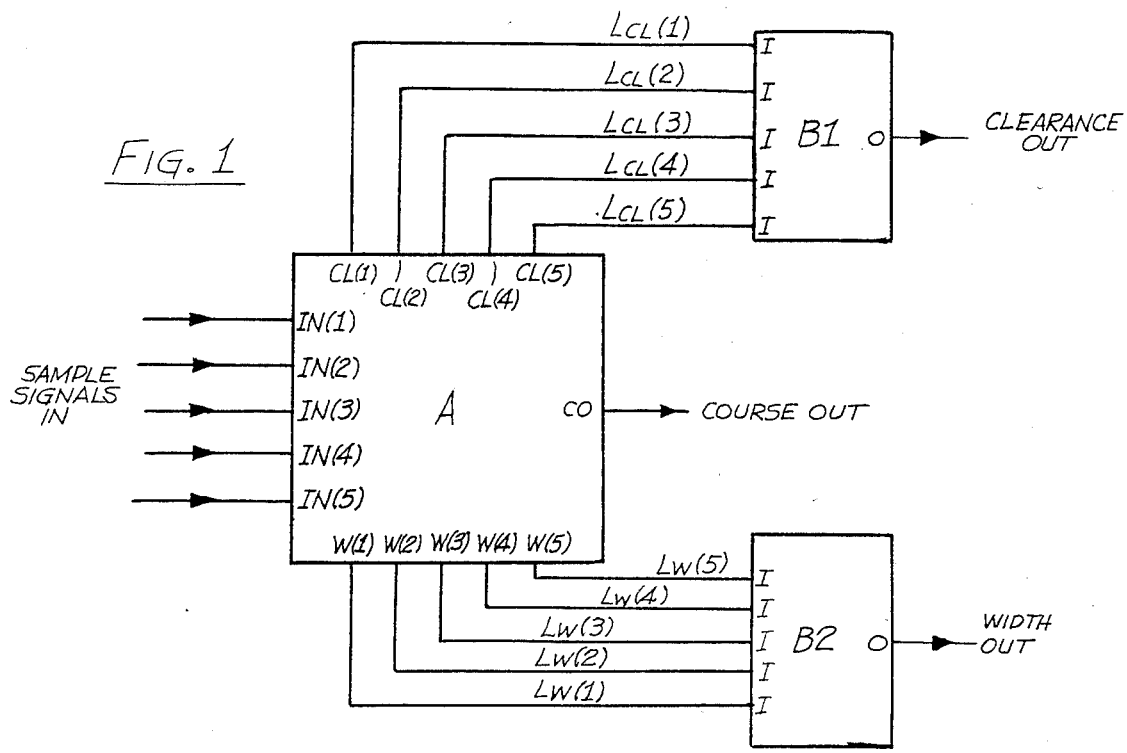
FIG. 1 is a schematic representation of the invention showing the three main subassemblies, A, B1, and B2, as well as the transmission lines connecting these subassemblies.
Figure 2:
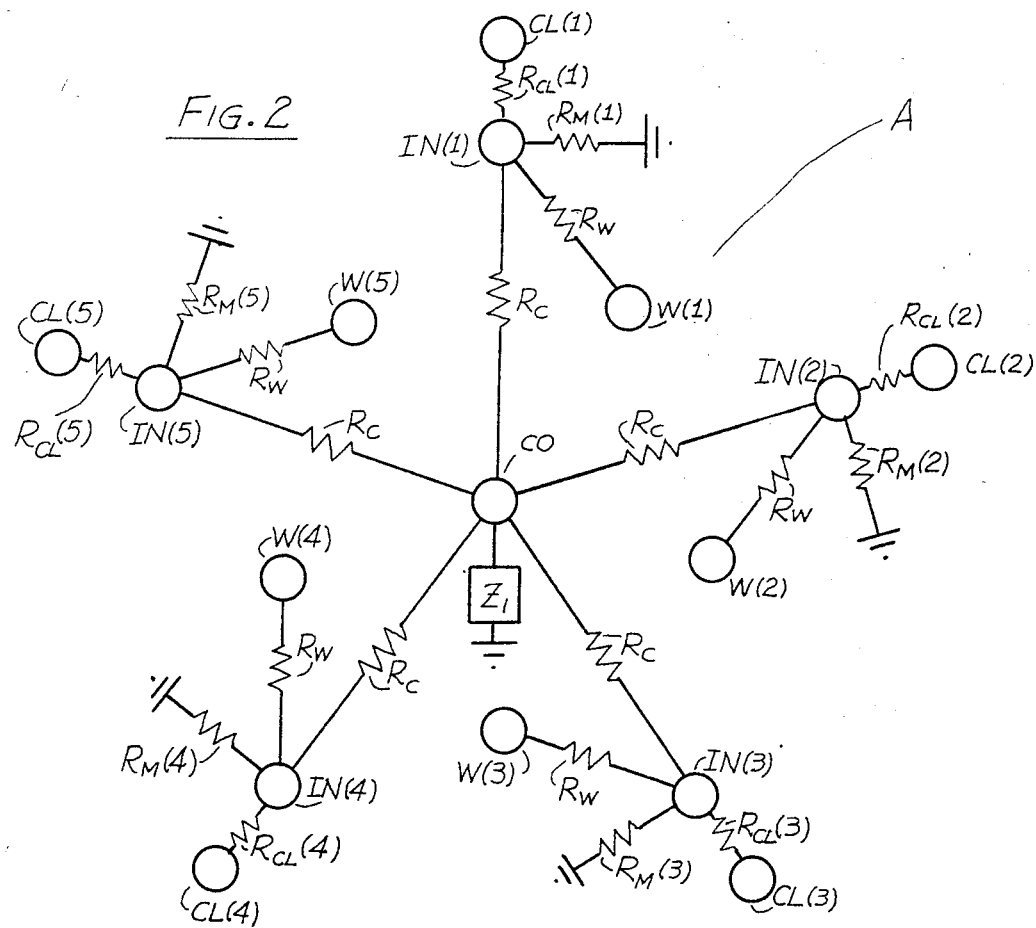
FIG. 2 is a schematic circuit diagram of subassembly A of FIG. 1.

Referring to FIGS. 1 and 2, course output terminal CO is connected to each of the sample signal input terminals IN(1) through IN(5) by five resistors, all of resistance value $R_c$. By the Superposition Theorem of electrical theory, the voltage at CO will be proportional to $$\sum_{m=1}^{5}$$

V(n), which, from equation (1), is an analog of the far field radiation at zero degrees.

Again referring to FIGS. 1 and 2, a resistor $R_w$ is connected between IN(n) and W(n), n equalling 1, 2, 3, 4, and 5. W(n) is connected to one of the five input terminals I of a summing network as shown in FIG. 3, through a transmission line of characteristic resistance $R_o$ and length $L_w(n)$, wheren $L_w(n)$ is determined from the formula $L_w(n) = (2\pi S(n)/\lambda) \times \sin \theta_w$. Each such transmission line is terminated in a matched load for practical purposes, since the impedance $Z_2$ shown in FIG. 3 is made much less than $R_o$. Therefore the nth line acts to produce a phase lag $(2\pi S(n)/\lambda) \times \sin \theta_w$. By superposition, the voltage appearing at terminal 0 of the summing network is proportional to $$\sum_{m=1}^{5}$$

$V(n) e^{-j(2\pi/\lambda)S(n) \sin \theta_w}$, which, from equation (1), is an analog of the far field signal radiated at the width angle $\theta_w$ Again referring to FIGS. 1 and 2, each input terminal IN(n) is connected to a terminal CL(n) through a resistor $R_{cl}(n)$. Terminal CL(n) is connected through a transmission line of characteristic resistance $R_o$ and length $L_{cl}(n)$ to one of the five inputs of a summing network as shown in FIG. 3. $L_{cl}(n)$ is determined from the formula $L_{cl}(n) = (2\pi/\lambda) \times S(n) \times \sin \theta_{cl}$. Hence the nth line, which is terminated in a matched load for practical purposes, acts to introduce a phase lag equal to $L_{cl}(n)$. Since $L_{cl}(n)$ can be as high as 2500 degrees, significant attenuation can be introduced as well as phase shift. Unless compensated, such attenuation will result in an error. In the invention, the line attenuation is compensated by adjusting the value of $R_{cl}(n)$ according to the formula $$R_{cl}(n) = 10^{(A(1) - A(n))/20} \times (R_{cl}(1) + R_o) - R_o \qquad (2)$$

In equation (2), A(n) is the attenuation of line n in decibels, and it is assumed that the longest line is that for which n=1. If $R_{cl}(n)$ is determined from equation (2), then the set of five $R_{cl}$ resistors will act to introduce additional attenuation such that overall attenuation is the same for all n. If this is the case, the voltage appearing at terminal 0 of the summing network will, by superposition, be proportional to $$\sum_{m=1}^{5}$$

$V(n) \times e^{-j(2\pi/\lambda)S(n) \sin \theta_{cl}}$ and will therefore be, by equation (1), an analog of far-field radiation at an angle $\theta_{cl}$.

It is usually required that the sampling lines conveying sample signal from the individual antennas of the Localizer array to the monitoring unit be terminated in a matched load. This is accomplished in the invention by connecting a resistor $R_m(n)$ between IN(n) and ground, where $R_m(n)$ is determined by the following formula in order to make the input impedance at IN(n) equal to the characteristic resistance $R_o$ of the sampling lines;

$$R_m(n) = (1/R_o - 1/R_c - 1/(R_w + R_o) - 1/(R_{cl}(n) + R_o))^{-1}$$

Monitor outputs will be theoretically exact analogs only if the sample voltages V(n) are supplied by ideal voltage sources having zero internal impedance. In practice, there will be some crosstalk between channels. Crosstalk can be calculated from the following formula, which applies to course output, with similar formulas applicable to width and clearance outputs;

$$\text{course output} = (1/Y_{cc}) \left( \sum_{m=1}^{5} V(n) Y_{cn} + V_{cl} Y_{c-cl} + V_w Y_{c-w} \right) \qquad (3)$$

$Y_{cc}$ is the self-admittance looking into the course output terminal, $Y_{cn}$ is the mutual admittance between IN(n) and the course output terminal, $Y_{c-cl}$ is the mutual admittance between the course output terminal and the clearance output terminal, $Y_{c-w}$ is the mutual admittance between the course output terminal and the width output terminal, $V_{cl}$ is the clearance output, and $V_w$ is the width output.

The last two terms in (3) are crosstalk. It is clear that the ratio of crosstalk to desired signal can be reduced by reducing the level of $V_{cl}$ and $V_w$, which can be accomplished by reducing the impedances $Z_1$ and $Z_2$ of FIGS. 2 and 3. In practice, an acceptable tradeoff between crosstalk and signal attenuation can be achieved with $Z_1$ is less than $R_c/20$ and $Z_2$ is less than $R_o/5$.

I claim:

1. A system for ground based monitoring of the signals radiated by an Instrument Landing System Localizer antenna array operating at wavelength $\lambda$, said array consisting of N individual antennas disposed along a line perpendicular to a runway, each individual antenna being fitted with sampling means for obtaining a signal proportional to the radiofrequency current driving that antenna, each individual antenna being identified herein by a distinct index number n, the distance between antenna n and a reference point on the line of the array being identified here as S(n), said monitoring to consist of prediction of signals radiated by said array at three specified angles from the centerline of said runway, one such angle being zero degrees, the other two being identified here as $\theta_w$ and $\theta_{cl}$, said monitoring system to consist of the combination of, N input terminals designated here as IN(1) through IN(N), IN(n) being connected to said sampling means of antenna n by a transmission line of characteristic resistance $R_o$, all such lines being of equal length, for each input terminal, the parallel combination of four circuits connected between that terminal and circuit ground, said four circuits being designated here as COURSE(n), WIDTH(n), CLEARANCE(n), and MATCHING(n), the index number of each circuit being that of the input terminal to which it is connected, and the four circuits being further defined as follows, COURSE(n) consisting of a resistor $R_c$ between IN(n) and a first output terminal, said output terminal being connected to ground through an impedance less than $R_c/20$, WIDTH(n) consisting of a resistor $R_w$ between IN(n) and one end of a transmission line of length $L_w(n)$ and characteristic resistance $R_o$, the other end of said line being connected to one terminal of a resistor $R_o$, the other terminal of said resistor $R_o$ being connected to a second output terminal, said second terminal being connected to ground through an impedance less than $R_o/5$, and $L_w(n)$ being determined from the formula $L_w(n) = S(n) \times \sin(\theta_w) \times (2\pi/\lambda)$, CLEARANCE(n) consisting of a resistor $R_{cl}(n)$ between IN(n) and one end of a transmission line of length $L_{cl}(n)$, characteristic resistance $R_o$, and attenuation $A(n)$ decibels, the other end of said line being connected to one terminal of a resistor $R_o$, the other terminal of said resistor $R_o$ being connected to a third output terminal, said third terminal being connected to ground through an impedance less than $R_o/5$, $L_{cl}(n)$ being determined from the formula $L_{cl}(n) = S(n) \times \sin(\theta_{cl}) \times (2\pi/\lambda)$, and $R_{cl}(n)$ being determined from the formula $R_{cl}(n) = 10^{(A(1)-A(n))/20} \times (R_{cl}(1)+R_o) - R_o$, MATCHING(n) consisting of a resistor $R_m(n)$ between IN(n) and ground, $R_m(n)$ being determined from the formula $R_m(n) = (1/R_o - 1/(R_o+R_w) - 1/(R_o+R_c) - 1/(R_{cl}(n)+R_o))^{-1}$.

* * * * *